(12) United States Patent
Wu et al.

(10) Patent No.: US 11,451,279 B2
(45) Date of Patent: Sep. 20, 2022

(54) SUBBAND CHANNEL STATE INFORMATION (CSI) OMISSION FOR TYPE-II CSI

(71) Applicant: QUALCOMM Incorporated, San Diego, CA (US)

(72) Inventors: Liangming Wu, Beijing (CN); Yu Zhang, Beijing (CN); Chenxi Hao, Beijing (CN); Chao Wei, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 16/650,171

(22) PCT Filed: Sep. 29, 2018

(86) PCT No.: PCT/CN2018/108593
§ 371 (c)(1),
(2) Date: Mar. 24, 2020

(87) PCT Pub. No.: WO2019/068250
PCT Pub. Date: Apr. 11, 2019

(65) Prior Publication Data
US 2020/0235796 A1    Jul. 23, 2020

(30) Foreign Application Priority Data

Oct. 2, 2017 (WO) ................ PCT/CN2017/105238

(51) Int. Cl.
*H04W 4/00* (2018.01)
*H04B 7/06* (2006.01)
*H04B 7/0417* (2017.01)
*H04B 7/0456* (2017.01)

(52) U.S. Cl.
CPC ......... *H04B 7/0626* (2013.01); *H04B 7/0417* (2013.01); *H04B 7/0486* (2013.01); *H04B 7/0632* (2013.01); *H04B 7/0639* (2013.01)

(58) Field of Classification Search
CPC .. H04B 7/0626; H04B 7/0417; H04B 7/0486; H04B 7/0632; H04B 7/0639
USPC ................................ 375/326, 316, 295, 219
See application file for complete search history.

(56) References Cited

U.S. PATENT DOCUMENTS

| 9,681,425 B2 | 6/2017 | Geirhofer et al. |
| 2013/0064128 A1 | 3/2013 | Li et al. |
| 2016/0065289 A1 | 3/2016 | Zhao et al. |
| 2017/0141827 A1* | 5/2017 | Liu ..................... H04B 7/0478 |

(Continued)

FOREIGN PATENT DOCUMENTS

| CN | 101877627 A | 11/2010 |
| CN | 104508997 A | 4/2015 |

(Continued)

OTHER PUBLICATIONS

International Search Report and Written Opinion—PCT/CN2017/105238—ISA/EPO—dated Jun. 22, 2018.

(Continued)

*Primary Examiner* — Zewdu A Kassa
(74) *Attorney, Agent, or Firm* — Qualcomm Incorporated

(57) ABSTRACT

Certain aspects of the present disclosure generally relate to methods and apparatus for generating and reporting CSI.

26 Claims, 10 Drawing Sheets

(56) References Cited

U.S. PATENT DOCUMENTS

2017/0244533 A1    8/2017    Onggosanusi et al.

FOREIGN PATENT DOCUMENTS

| WO | 2012149234 A1 | 11/2012 |
|---|---|---|
| WO | 2013169666 A2 | 11/2013 |

OTHER PUBLICATIONS

International Search Report and Written Opinion—PCT/CN2018/108593—ISA/EPO—dated Jan. 4, 2019.

Samsung, et al., "WF for Open Issues on CSI", 3GPP TSG-RAN WG1 NR-AH3, R1-1716726, Sep. 21, 2017 (Sep. 21, 2017), 19 Pages.

Samsung: "WF for Open Issues on CSI Reporting," 3GPP TSG-RAN WG1 NR-AH3 , R1-1716901, Sep. 18-21, 2017, 19 Slides.

Nokia, et al., "PUSCH Feedback Transmission for Type II Codebook", 3GPP Draft, 3GPP TSG RAN WG1 Meeting NR#3, R1-1716503, 3rd Generation Partnership Project (3GPP), Mobile Competence Centre, 650, Route Des Lucioles, F-06921, Sophia-Antipolis Cedex, France, vol. RAN WG1, No. Nagoya, Japan, Sep. 18, 2017-Sep. 21, 2017, Sep. 17, 2017 (Sep. 17, 2017), XP051339956, 8 pages, Retrieved from the Internet: URL: http://www.3gpp.org/ftp/Meetings_3GPP_SYNC/RAN1/Docs/ [retrieved on Sep. 17, 2017], section 2.

Nokia, et al., "Remaining Details for Type I and Type II CSI Reporting," 3GPP Draft, R1-1800754, 3GPP TSG RAN WG1 Meeting Ah 1801, 3rd Generation Partnership Project (3GPP), Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, Jan. 13, 2018 (Jan. 13, 2018), XP051385065, 6 pages, Retrieved from the Internet:URL: http://www.3gpp.org/ftp/tsg%5Fran/WG1%5FRL1/TSGR1%5FAH/NR%5FAH%5F1801/Docs/ [retrieved on Jan. 13, 2018] sections 2-3.

Qualcomm Incorporated: "On Remaining Issues of CSI Reporting", 3GPP Draft, R1-1718540, 3GPP TSG RAN WG1 Meeting 90bis, 3rd Generation Partnership Project (3GPP), Mobile Competence Centre, 650, Route Des Lucioles, F-06921, Sophia-Antipolis Cedex, France, vol. RAN WG1, No. Prague, Czech; Oct. 9, 2017-Oct. 13, 2017, Oct. 3, 2017 (Oct. 3, 2017), XP051353108, 3 pages, Retrieved from the Internet: URL: http://www.3gpp.org/ftp/tsg_ran/WG1_RL1/TSGR1_90b/Docs/ [retrieved on Oct. 3, 2017] ,section 2.

Supplementary European Search Report—EP18865024—Search Authority—Munich—dated May 20, 2021.

* cited by examiner

| RI | NZAW | M |
|---|---|---|
| 1 | any | K |
| 2 | <=8 | K |
| 2 | 9~12 | $\lfloor K * 2/3 \rfloor$ |
| 2 | 13~16 | $\lfloor K / 2 \rfloor$ |

*FIG. 10*

SUBBAND CHANNEL STATE INFORMATION (CSI) OMISSION FOR TYPE-II CSI

CROSS-REFERENCE TO RELATED APPLICATION & PRIORITY CLAIM

This application is a national stage application under 35 U.S.C. 371 of PCT/CN2018/108593, filed Sep. 29, 2018, which claims the benefit of and priority to International Patent Cooperation Treaty Application No. PCT/CN2017/105238, filed Oct. 2, 2017, which is hereby assigned to the assignee hereof and hereby expressly incorporated by reference herein as if fully set forth below and for all applicable purposes.

TECHNICAL FIELD

Certain aspects of the present disclosure generally relate to reporting of channel state information (CSI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Additionally, NR is expected to introduce new encoding and decoding schemes that improve transmission and reception of data. For example, Polar codes are currently being considered as a candidate for error-correction in next-generation wireless systems such as NR. Polar codes are a relatively recent breakthrough in coding theory, which have been proven to asymptotically (for code size N approaching infinity) achieve the Shannon capacity. However, while Polar codes perform well at large values of N, for lower values of N, polar codes suffer from poor minimum distance, leading to the development of techniques such as successive cancellation list (SCL) decoding, which leverage a simple outer code having excellent minimum distance, such as a CRC or parity-check, on top of a polar inner code, such that the combined code has excellent minimum distance.

However, as the demand for mobile broadband access continues to increase, there exists a need for further improvements in NR technology, such as improvements in encoding and decoding schemes for NR. Preferably, these improvements should be applicable to other multi-access technologies and the telecommunication standards that employ these technologies.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Certain aspects of the present disclosure provide a method of wireless communication, according to certain aspects of the present disclosure. The method generally includes determining, in a two-part channel state information (CSI) reporting scheme, a first number M out of N subbands to use for feeding back CSI in a second CSI feedback part, wherein N represents a configured number of supported subbands for subband precoding matrix indicator (PMI) reporting, deciding, based on a rank indicator (RI) and a non-zero wideband amplitude (NZWA) per layer, which of the N subbands to omit from the M subbands, and reporting CSI feedback for the M subbands in the second CS feedback part.

The techniques may be embodied in methods, apparatuses, and computer program products. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10 illustrates an example table that may be used to determine a number of subbands for CSI reporting, in accordance with certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
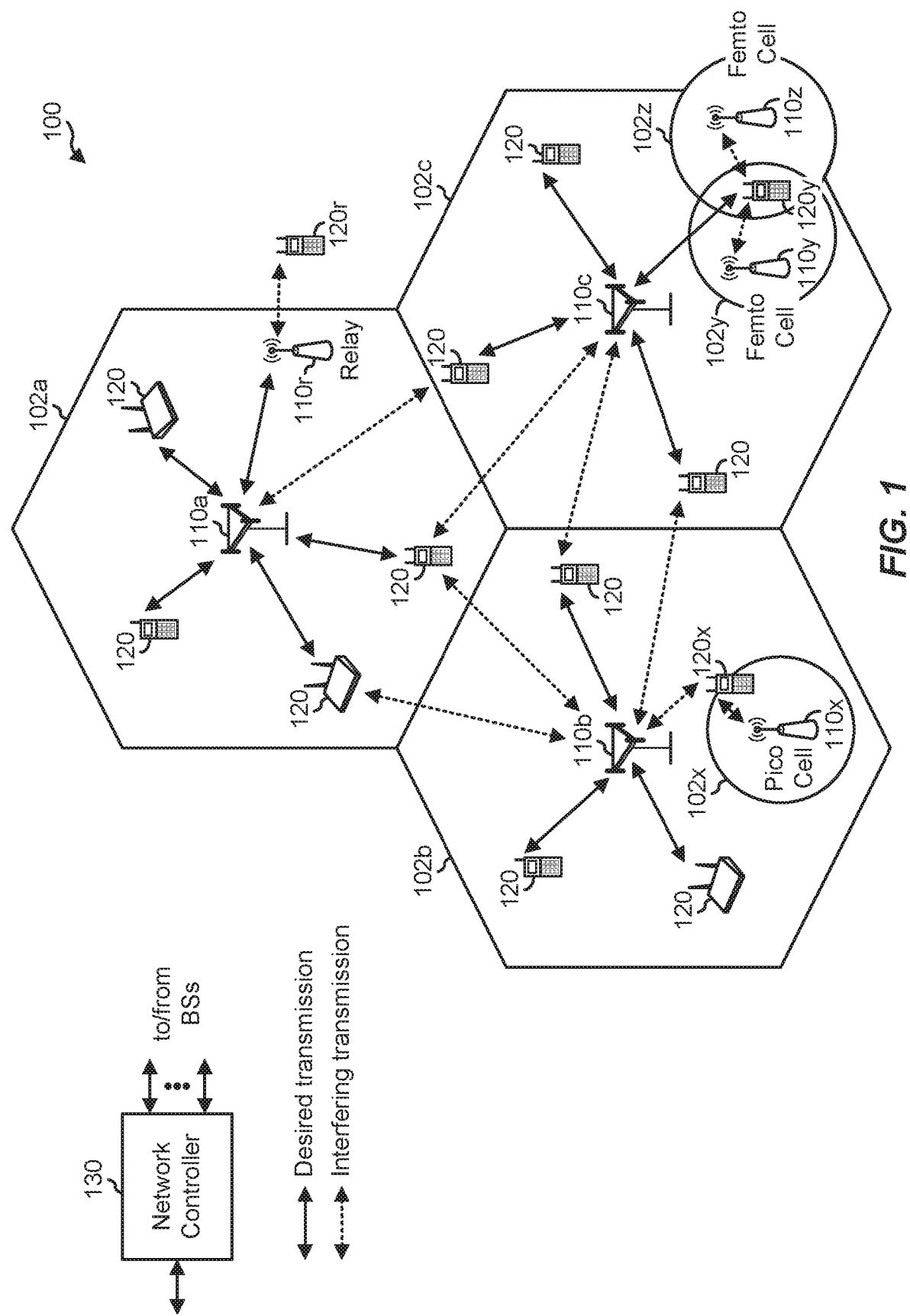
FIG. 1 is a block diagram conceptually illustrating an example telecommunications system, in accordance with certain aspects of the present disclosure.

Aspects of the present disclosure provide apparatus, methods, processing systems, and computer readable mediums for encoding bits of information. Such encoding can be used, for example, for compression or storage, or for transmission in networks, including wireless networks. For example, such encoding may be adopted for new radio (NR) (new radio access technology or 5G technology) wireless communication systems. It should be understood that, while aspects of the present disclosure are proposed in relation to a wireless communication system, the techniques presented herein are not limited to such wireless communication system. For example, the techniques presented herein may equally apply to compression or storage, or to other communication systems such as fiber communication systems, hard-wire copper communication systems, and the like. In other words, the techniques presented herein may be applied to any system using an encoder.

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies Additionally, the techniques presented herein may be used in various other non-wireless communication networks, such as fiber network, hard-wire "copper" networks, and the like, or in digital storage or compression. In other words, the techniques presented herein may be used in any system which includes an encoder.

FIG. 1 illustrates an example wireless network 100, such as a new radio (NR) or 5G network, in which aspects of the present disclosure may be performed, for example, for reducing the search space of maximum-likelihood (ML) decoding for polar codes. In some cases, the network 100 may be a fiber network, a hard-wire "copper" network, or the like.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR/S5G.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame has a length of 10 ms and may consist of two half frames, each half frame comprising five subframes each with a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with preceding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
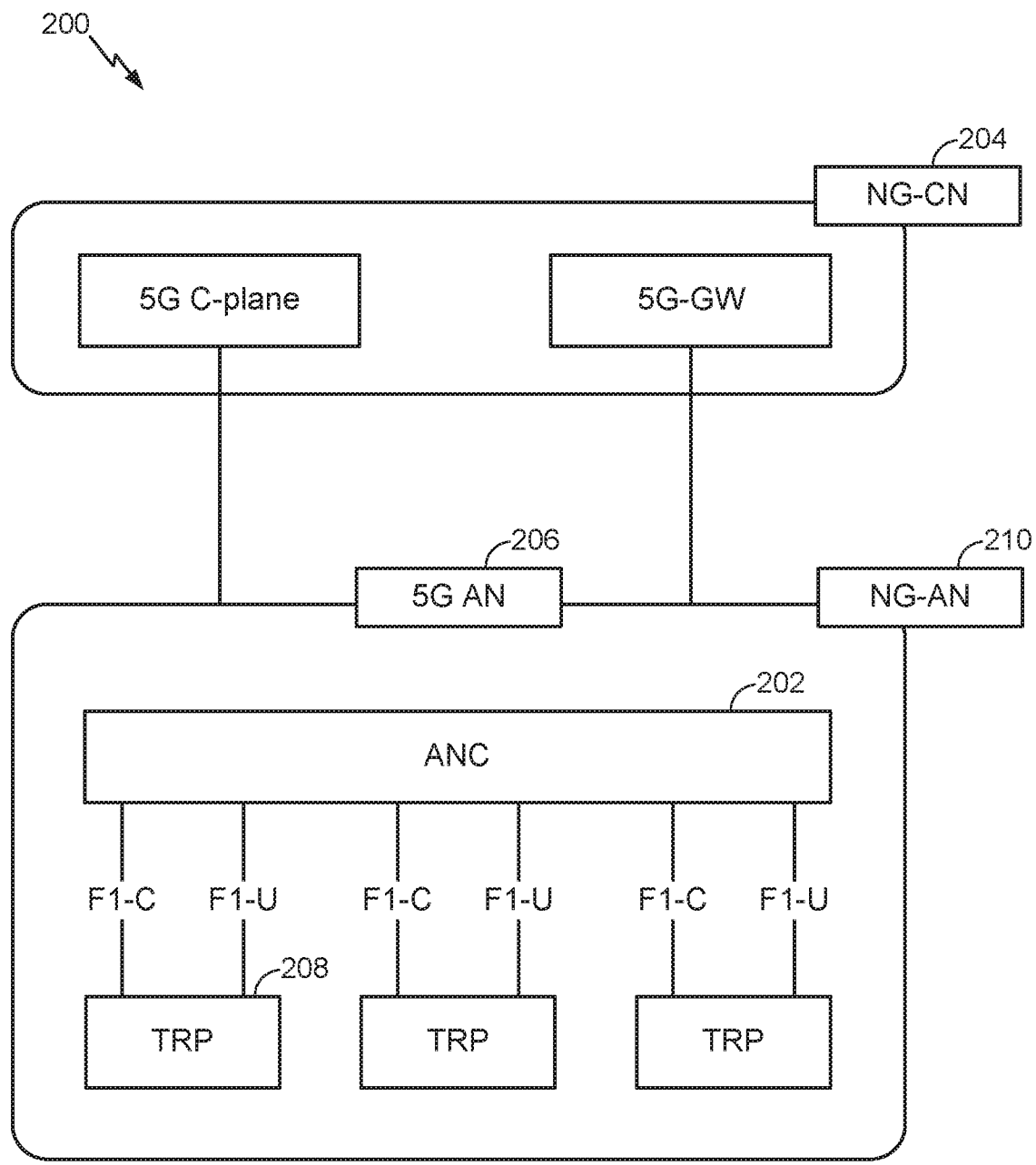
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
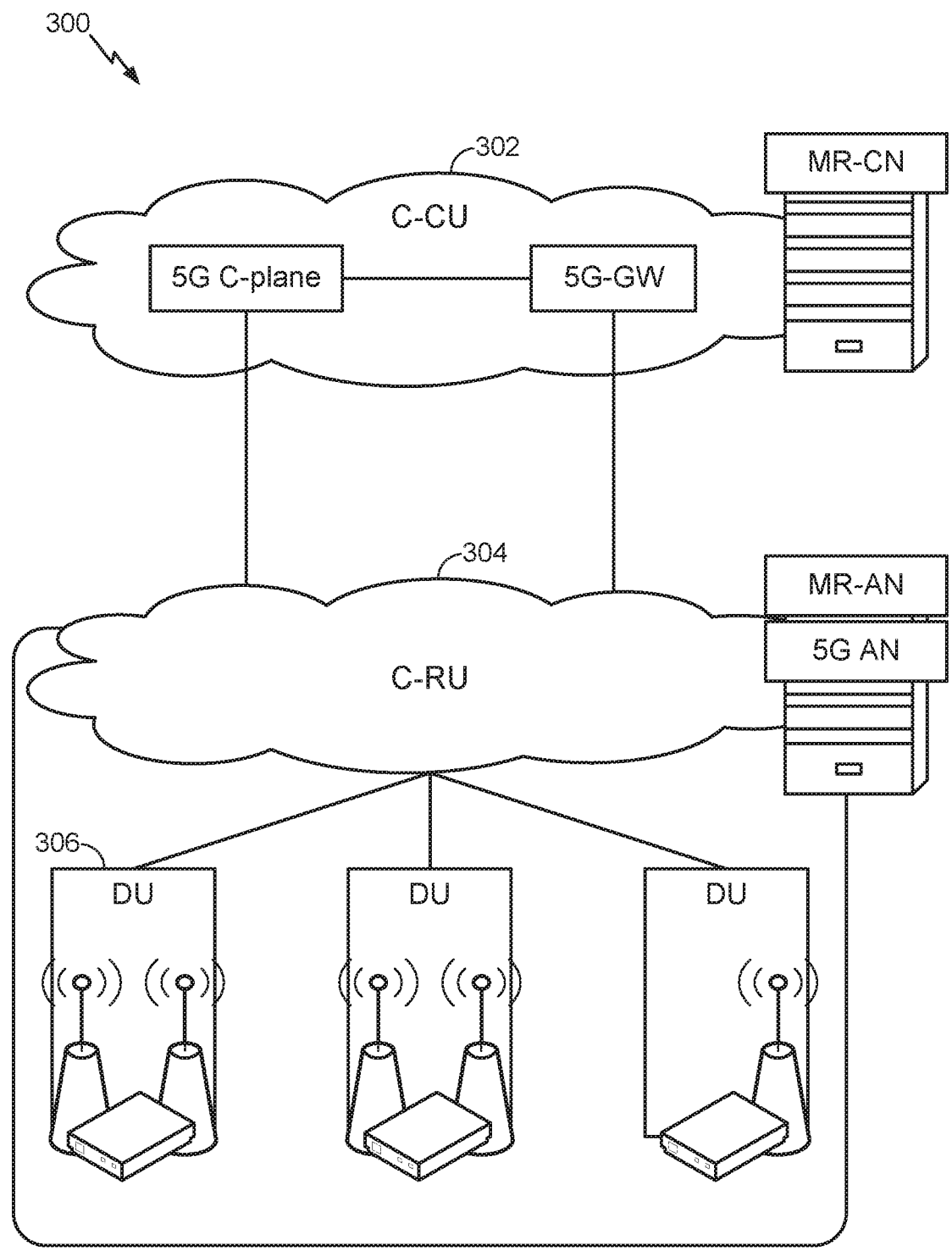
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
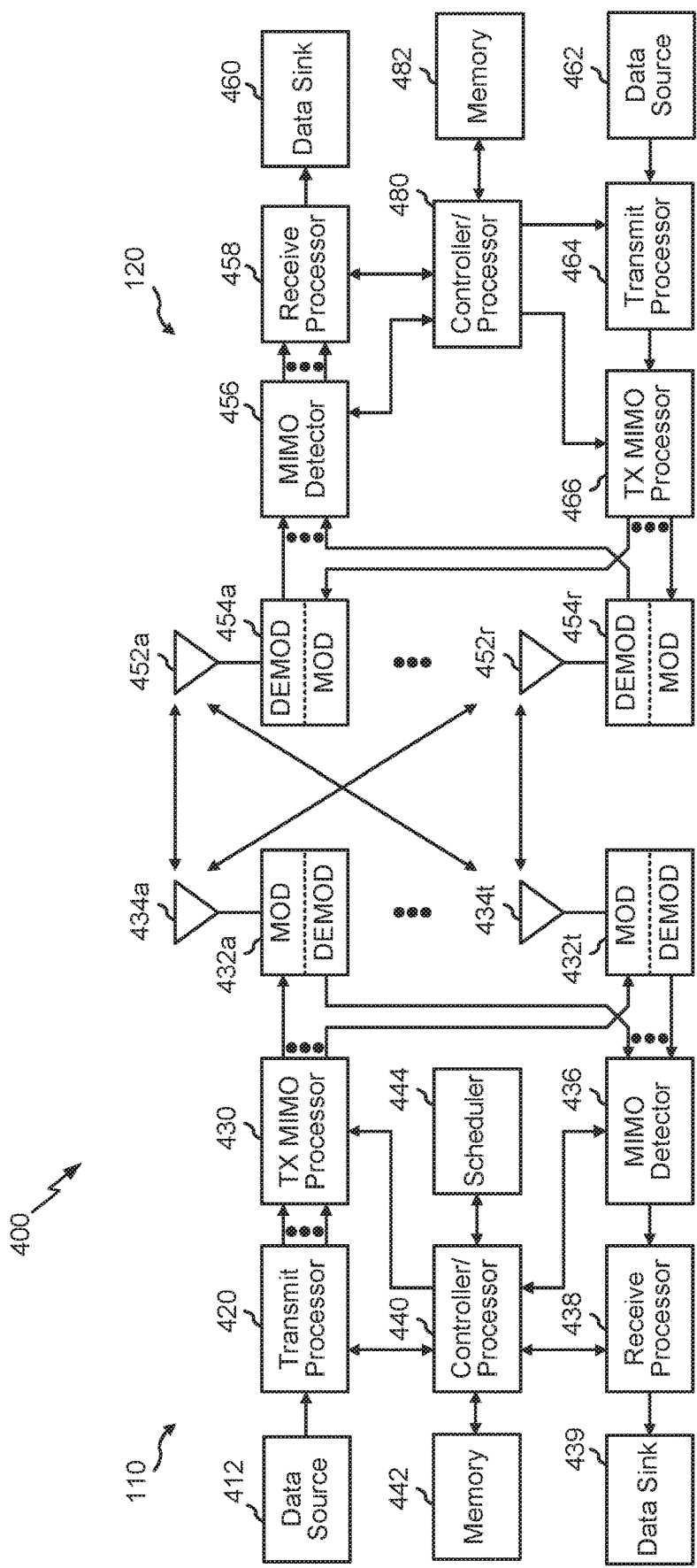
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 9.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 6, and/or other processes for the techniques described herein. The processor 480 and/or other processors and modules at the UE 120 may also perform or direct, e.g., the execution of the functional blocks illustrated in FIG. 7, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
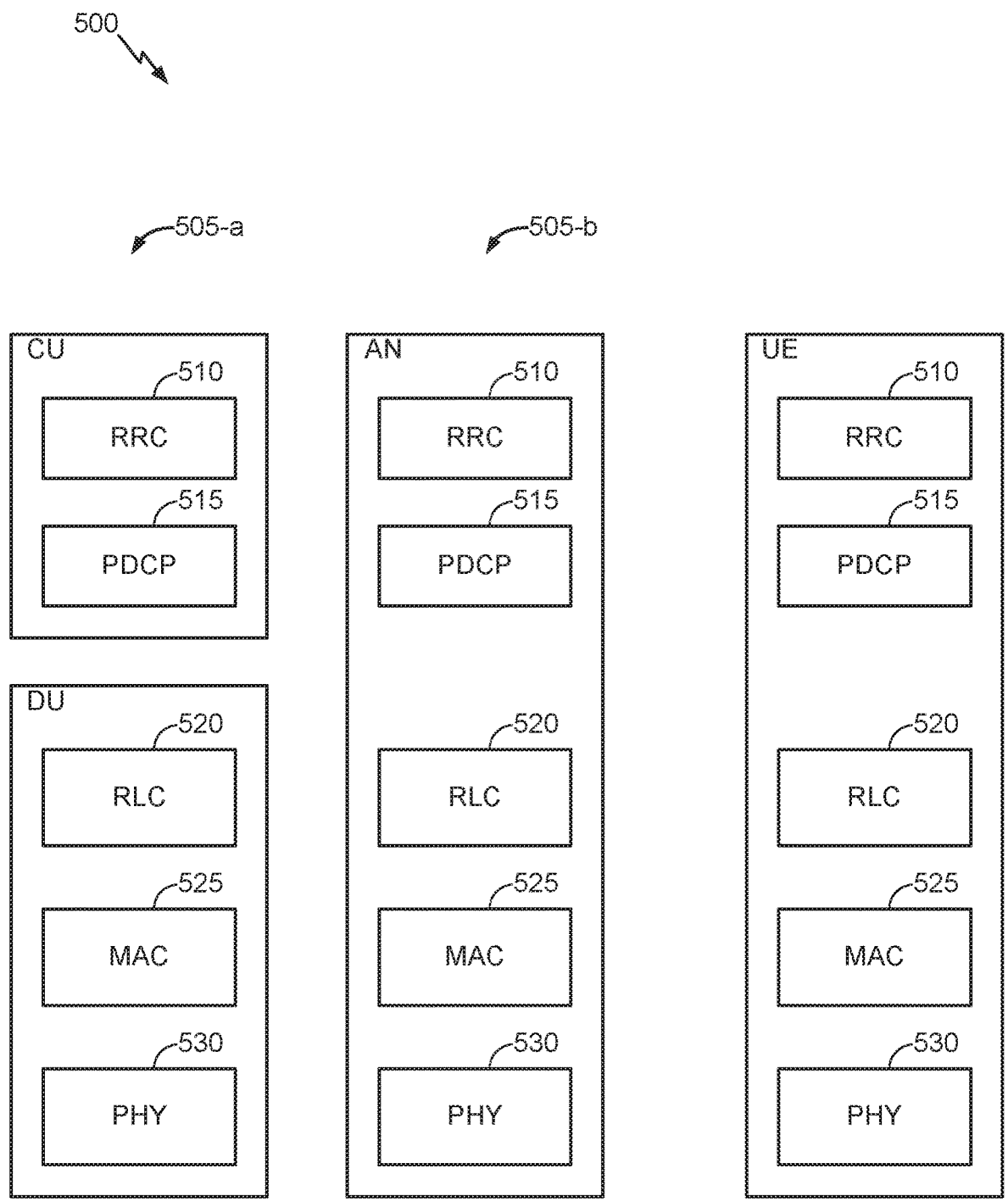
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
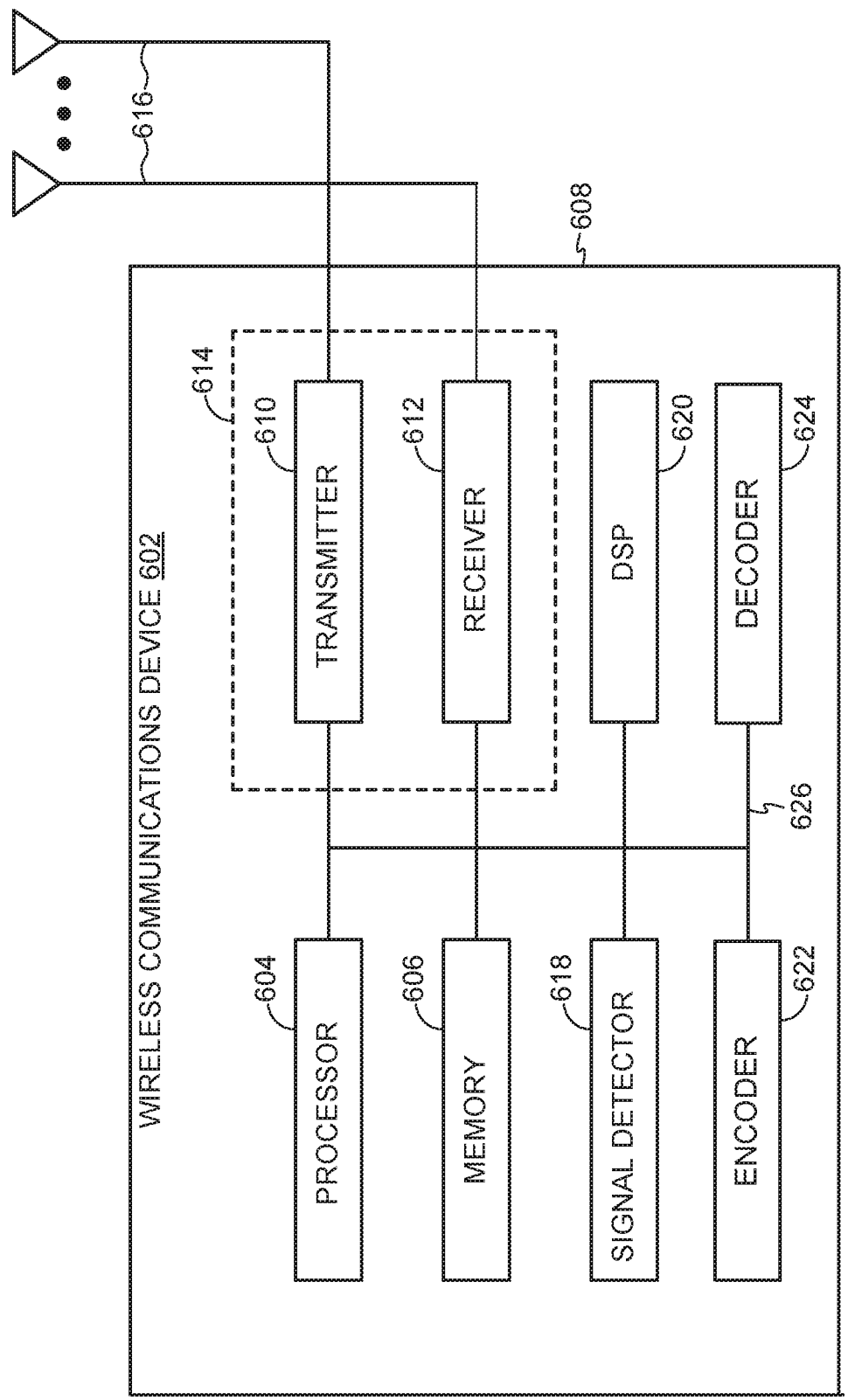
FIG. 6 illustrates a block diagram of an example wireless device in accordance with certain aspects of the present disclosure.

FIG. 6 illustrates various components that may be utilized in a wireless communications device 602 that may be employed within the wireless communication system from FIG. 1. The wireless communications device 602 is an example of a device that may be configured to implement the various methods described herein, for example, for reducing the search space of ML decoding for polar codes. The wireless communications device 602 may be an BS 110 from FIG. 1 or any of user equipments 120.

The wireless communications device 602 may include a processor 604 which controls operation of the wireless communications device 602. The processor 604 may also be referred to as a central processing unit (CPU). Memory 606, which may include both read-only memory (ROM) and random access memory (RAM), provides instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable to implement the methods described herein.

The wireless communications device 602 may also include a housing 608 that may include a transmitter 610 and a receiver 612 to allow transmission and reception of data between the wireless communications device 602 and a remote location. The transmitter 610 and receiver 612 may be combined into a transceiver 614. A single or a plurality of transmit antennas 616 may be attached to the housing 608 and electrically coupled to the transceiver 614. The wireless communications device 602 may also include (not shown) multiple transmitters, multiple receivers, and multiple transceivers.

The wireless communications device 602 may also include a signal detector 618 that may be used in an effort to detect and quantify the level of signals received by the transceiver 614. The signal detector 618 may detect such signals as total energy, energy per subcarrier per symbol, power spectral density and other signals. The wireless communications device 602 may also include a digital signal processor (DSP) 620 for use in processing signals.

Additionally, the wireless communications device 602 may also include an encoder 622 for use in encoding signals for transmission. For example, in some cases, the encoder 622 may be configured to distribute/assign a first one or more bits into a location of an information stream, wherein the first one or more bits indicate at least one of a bit value of one or more second bits in the information stream or a size of the information stream.

Further, the wireless communications device 602 may include a decoder 624 for use in decoding received signals encoded using techniques presented herein. For example, in some cases, the decoder 624 may be configured to decode a first portion of a codeword, wherein the first portion of the codeword corresponds to a location in the information stream where a first one or more bits are assigned, wherein the first one or more bits indicate at least one of bit value of one or more second bits in the information stream or a size of the information stream, determine the bit value of the one or more second bits based, at least in part, on the first one or more bits, and decode a remaining portion of the codeword based on the determined bit value of the one or more second bits.

The various components of the wireless communications device 602 may be coupled together by a bus system 626, which may include a power bus, a control signal bus, and a status signal bus in addition to a data bus. The processor 604 may be configured to access instructions stored in the memory 606 to perform connectionless access, in accordance with aspects of the present disclosure discussed below.

Figure 7:
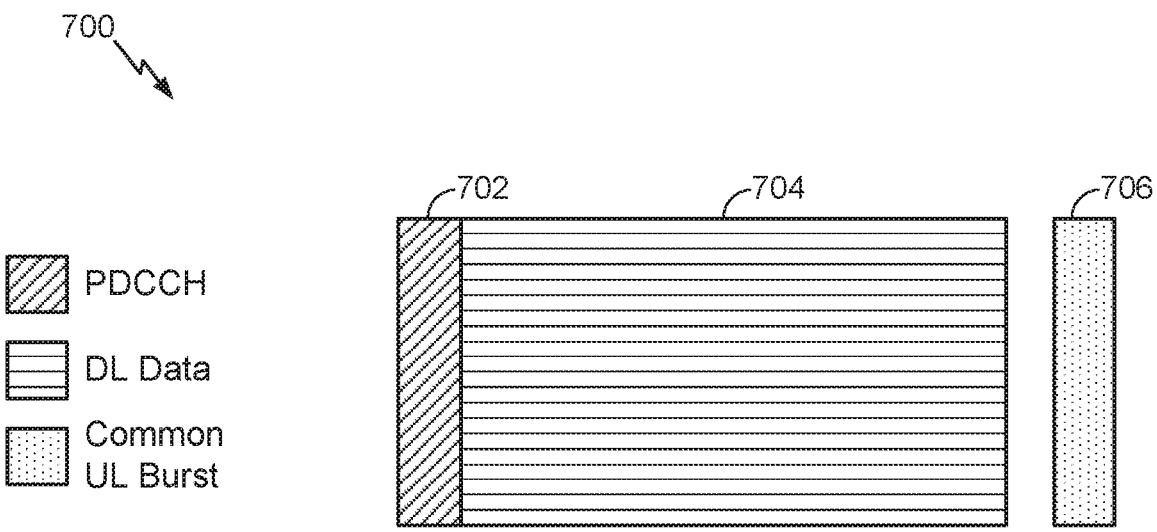
FIG. 7 illustrates an example of a DL-centric subframe, in accordance with certain aspects of the present disclosure.

FIG. 7 is a diagram 700 showing an example of a DL-centric subframe, which may be used by one or more devices (e.g., BS 110 and/or UE 120) to communicate in the wireless network 100. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 702. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 8:
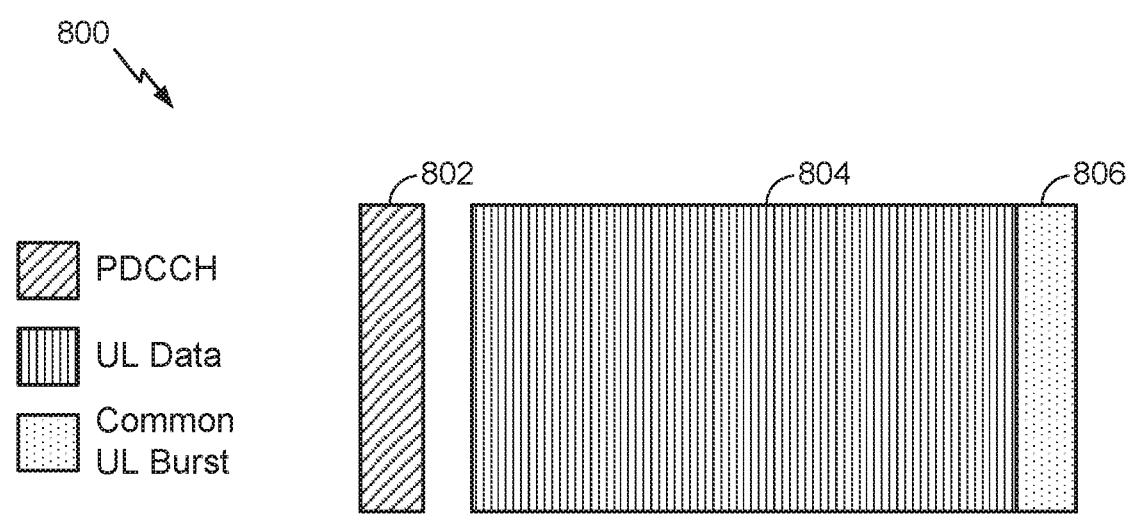
FIG. 8 illustrates an example of an UL-centric subframe, in accordance with certain aspects of the present disclosure.

FIG. 8 is a diagram 800 showing an example of an UL-centric subframe, which may be used by one or more devices (e.g., BS 110 and/or UE 120) to communicate in the wireless network 100. The UL-centric subframe may include a control portion 802. The control portion 802 may exist in the initial or beginning portion of the UL-centric subframe. The control portion 802 in FIG. 8 may be similar to the control portion described above with reference to FIG. 7. The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 806. The common UL portion 806 in FIG. 8 may be similar to the common UL portion 806 described above with reference to FIG. 8. The common UL portion 806 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In 5G new radio (NR), aperiodic channel state information (CSI) reports are triggered by a CSI report trigger transmitted from a base station to a user equipment. The CSI report trigger indicates to the UE the timing and allocated resources to perform CSI reporting. In some cases, when the CSI report are transmitted by the UE via a physical uplink shared channel (PUSCH), the CSI report trigger may be sent via and uplink (UL) grant containing a resource allocation (RA) information from which UE is aware of which resource is used to perform the CSI report. According to aspects, the CSI report may include a CSI-reference signal channel indicator (CRI), a rank indicator (RI), channel quality information (CQT), and a pre-coding matrix indicator (PMI). The PMI can be further categorized into wideband PMI (WB PMI) or subband PMI (SB PMI). For type II linear combination codebook, the WB PMI includes rotation indication, beam indication, wideband amplitude indication and strongest beam indication; the SB PMI includes subband amplitude indicator and subband phase indicator.

In some cases, the payload size of CRI, RI and CQI are fixed, while the PMI (especially the subband PMI) payload size may vary depending on the reported RI. From this aspect, the CSI reporting may be divided into two or three parts, where the a first portion of the CSI feedback contains CRI/RI/CQI whose payload is fixed, while the second and third portions of the CSI feedback contain PMI whose payload sizes depend on the first portion (and where the third portion may also depend on the second portion). Table 1, below, illustrates the different scenarios of when CSI feedback may be partitioned into two or three portions and the information carried in each portion.

TABLE 1

|  | $1^{st}$ portion | $2^{nd}$ portion | $3^{rd}$ portion |
| --- | --- | --- | --- |
| Case 1 | CRI/RI/CQI (for $1^{st}$ codeword) | PMI (WB/SB) (CQI for $2^{nd}$ codeword may be included if applicable) | N/A |
| Case 2 | CRI/RI/CQI (for $1^{st}$ codeword)/ WB PMI | SB PMI (CQI for $2^{nd}$ codeword may be included if applicable) | N/A |
| Case 3 | CRI/RI/CQI (for $1^{st}$ codeword) | WB PMI | SB PMI (CQI for $2^{nd}$ codeword may be included if applicable) |

Example Subband CSI Omission for Type-H CSI

In the two-part CSI reporting scheme described above, certain parameters may be included or may not be included (may be omitted) in a CSI report. As described above, the first part of the two-part scheme may contain RI, CQI and an indication of the number of non-zero wideband amplitude (NZWA) coefficients per layer. Thus, while a fixed payload size may be used for the first part, the payload size of second part containing remaining CSI may vary.

Separately encoded parts of a CSI report carried on PUSCH also carrying UL-SCH (data) may have different transmission priority. For example, the first part (used to identify the number of information bits in part 2) may have a higher priority than the second part. Thus, the first part may be included in a transmission in its entirety before part 2. In some cases, information bits and/or channel coded bits of part 2 may only be partially transmitted. For example, CSI parameters corresponding to certain subbands for part 2 may be omitted.

Aspects of the present disclosure provide techniques for determining how many subbands should be reported (in the second part), as well as which subbands should be omitted.

Figure 9:
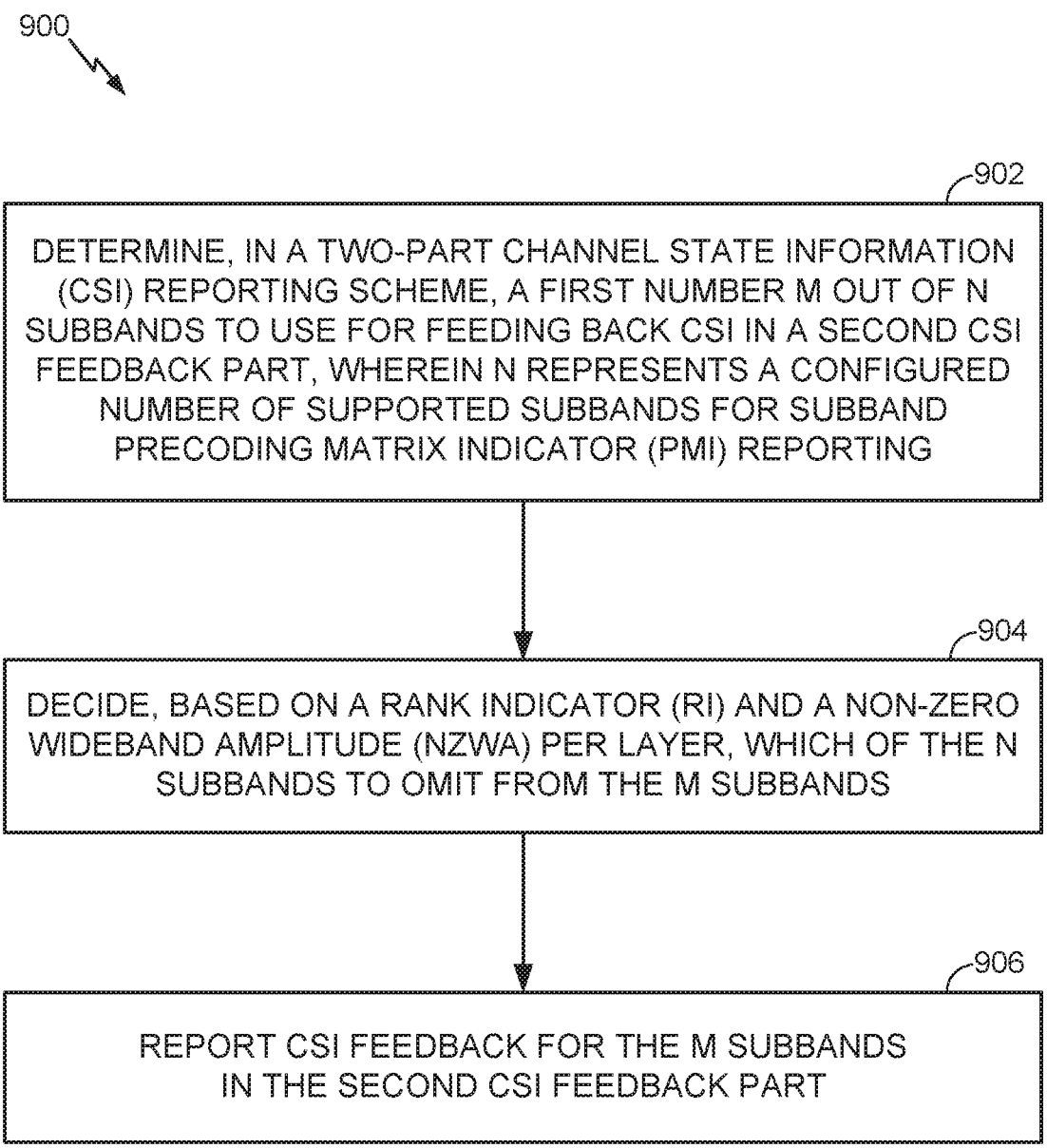
FIG. 9 illustrates example operations for wireless communications, in accordance with certain aspects of the present disclosure.

FIG. 9 illustrates example operations 900 for wireless communications. Operations 900 may be performed, for example, by a UE for channel state information reporting, in accordance with certain aspects of the present disclosure. Similar operations may be performed at the base station (e.g., gNB) side, for example, to determine the packet size and encoding used to process CSI reports from a UE.

Operations 900 begin, at 902, by determining, in a two-part channel state information (CSI) reporting scheme, a first number M out of N subbands to use for feeding back CSI in a second CSI feedback part, wherein N represents a configured number of supported subbands for subband precoding matrix indicator (PMI) reporting.

At 904, the UE decides, based on a rank indicator (RI) and a non-zero wideband amplitude (NZWA) per layer, which of the N subbands to omit from the M subbands. At 906, the UE may report CSI feedback for the M subbands in the second CSI feedback part.

In other words, because the second packet (for part 2) payload size depends on both RI and non-zero wideband amplitude per layer (referred to as $NAZ_i$ for the i-th layer), both RI and $NAZ_i$ may be considered as input for deciding which subband(s) to select for omission.

After deciding how many subbands to feedback (with the number of subbands to report referred to as M subbands), the actual subband index(es) to be fed back may need to be determined. In some cases, the subband indexes to be omitted may be determined based CQI information in the first packet (carrying the first part).

In some cases, the number of subbands M may be determined based on a mapping rule or table, based on RI and non-zero wideband amplitude per layer. For example, FIG. 10 illustrates an example mapping table (e.g., for L=4 linear combined beams) that may be used by a UE, to determine M based on RI and NZWA. In this example, NZWA stands for the sum of non-zero wideband amplitudes per layer. For example, if $1^{st}$ layer non-zero amplitude is 2 and 2nd layer non-zero amplitude is 3, then NZWA would be 5 (2+3). Given the M determined (e.g., from the table), M subband PMI would then be included in the $2^{nd}$ packet. The mapping table can be pre-defined or base station configurable.

Instead of a mapping table, a mapping rule may be used. For example, a mapping rule based on NZWA and RI may be as follows:

$$M = \left\lfloor K * \frac{\alpha}{NZWA - 2} \right\rfloor \text{ for } RI = 2,$$
$$\text{otherwise } M = K$$

wherein, α could be based on parameters related to resource allocation.

In some cases, M may be chosen to ensure that Type-II subband payload can be carried in the CSI reporting. For example, given:

Rank value $v, v \in [1,2]$ wideband PMI payload size $Q_{1,v}$, would be inclusive of all $i_1$ bits. Per subband PMI payload $Q_{2,v}$, may be inclusive of all $i_2$ bits. In some cases, a base station may configure subband size K. The maximum supported payload size of the 2nd packet $Q_{max}$, may be derived based on, for example, a resource allocation (RA) for Type-II CSI (e.g., resource allocation between 1st and 2nd packet).

In some cases, the per subband payload size $Q_{2,v}$ may be determined based on RI and $NZA_i$. M may be selected with a constraint, for example, that:

$$M*Q_{2,v} + Q_{1,v} \leq Q_{max}$$

This constraint may help ensure that a maximum supported number of M subbands is fed back.

Actual subbands to omit from or include in M may be determined based on various factors. For example, omitted subbands may be determined based on a decimation ratio and/or a priority pattern used to order subband CSI (which may be defined in specification). In some cases, omitted subbands may be determined based on the measured subband CQI included in part 1 (in the 1 st packet).

In other words, the actual subband indexes (of the M subbands) may be selected according to the CQI in the $1^{st}$ packet. For example, in some cases, two subbands within N consecutive subbands may be selected for subband PMI feedback. The two subbands may include one subband associated with the best CQI in the N subbands, and the other subband may be associated with the worst CQI in the N subbands. If M is an odd number, one subband (not associated with the best or worst CQI) may be selected from N*(M−1)/2+1~K-th subband. In some cases, the number N of consecutive subbands may be determined based at least on K and M. In some cases, a number of segmented subbands may be selected as:

$$S = \text{ceil}(M/2).$$

In some cases, subbands corresponding to the best CQI associated subbands out of the subbands may be selected by a decimation pattern. For example, for M selected subbands for feedback, given that a decimation pattern may already define feedback subbands (M1), M2=M−M1 subbands may be selected from the best CQI associated subbands out of the decimation selected beams.

Figure 11:
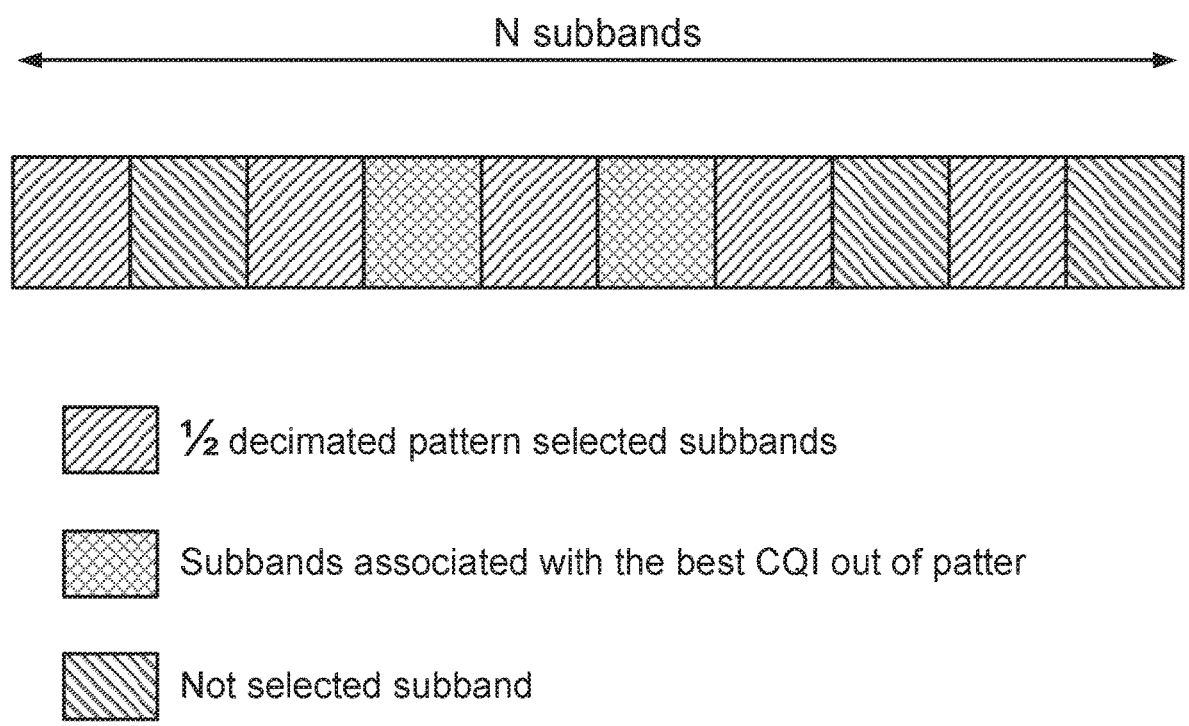
FIG. 11 illustrates an example of CQI associated subbands selected by a decimation pattern, in accordance with certain aspects of the present disclosure.

For example, as illustrated in FIG. 1, with a total of N configured subbands, a decimation pattern may be used when M=N/2. If M>N/2, then M−N/2 subbands which have best CQI in non-selected subbands may be included in part-2 PMI feedback. As illustrated in FIG. 11, this results in an additional 2 subbands being selected (in addition to the subbands selected based on the decimation pattern). As illustrated, the decimation pattern may result in the inclusion/omission of every other subband. In other words, in some cases, the subband omission may be performed to include only even subbands or odd subbands for the Type-II feedback, in an effort to ensure the wideband part is transmitted.

It should be noted that the techniques described above may equally apply to CSI reporting on both a long or short physical uplink control channel (PUCCH) or a physical uplink shared channel (PUSCH). Further, the techniques described above may also equally apply to any of aperiodic, semi-persistent, or periodic CSI reporting.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 of FIG. 9 described above may be performed by one or more of transmit processor 464, controller/processor 480, or receive processor of the UE 120 of FIG. 4.

For example, means for transmitting, means for receiving, means for determining, means for performing, and/or means for re-transmitting may comprise one or more processors or antennas at the BS 110 or UE 120, such as the transmit processor 420, controller/processor 440, receive processor 438, or antennas 434 at the BS 110 and/or the transmit processor 464, controller/processor 480, receive processor 458, or antennas 452 at the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
    determining, in a two-part channel state information (CSI) reporting scheme, a first number M out of N subbands to use for feeding back CSI in a second CSI feedback part, wherein N represents a configured number of supported subbands for subband precoding matrix indicator (PMI) reporting;
    deciding, based on a rank indicator (RI) and a non-zero wideband amplitude (NZWA) per layer, which of the N subbands to omit from the M subbands; and
    reporting CSI feedback for the M subbands in the second CSI feedback part.

2. The method of claim 1, wherein the determination of M is based on a mapping rule using the RI and NZWA.

3. The method of claim 1, wherein the determination of M is based on a lookup table accessed based on the RI and NZWA.

4. The method of claim 3, wherein the mapping table is configured by a base station.

5. The method of claim 3, wherein the mapping table is associated with the configured or allocated resource for CSI reporting.

6. The method of claim 3, wherein the mapping table is generated differently depending on what resource is allocated for CSI feedback.

7. The method of claim 1, wherein the determination of M is performed to ensure the CSI feedback for the M subbands will fit based on a payload size of the second CSI feedback part.

8. The method of claim 7, wherein M is selected based on a maximum supported value for the payload size.

9. The method of claim 1, wherein:
    a first subband associated with a best CQI in a set of consecutive subbands is included in the M subbands; and
    a second subband associated with a worst CQI in the set of consecutive subbands is also included in the M subbands.

10. The method of claim 1, wherein:
    the subbands to include in the M subbands is based on a decimation pattern.

11. The method of claim 10, wherein:
    the subbands to include in the M subbands is also based on a CQI associated with the subbands.

12. The method of claim 10, wherein:
    the decimation pattern results in the inclusion of every other subband of a set of subbands.

13. An apparatus for wireless communications, comprising:
    means for determining, in a two-part channel state information (CSI) reporting scheme, a first number M out of N subbands to use for feeding back CSI in a second CSI feedback part, wherein N represents a configured number of supported subbands for subband precoding matrix indicator (PMI) reporting;
    means for deciding, based on a rank indicator (RI) and a non-zero wideband amplitude (NZWA) per layer, which of the N subbands to omit from the M subbands; and
    means for reporting CSI feedback for the M subbands in the second CSI feedback part.

14. The apparatus of claim 13, wherein the determination of M is based on a mapping rule using the RI and NZWA.

15. The apparatus of claim 13, wherein the determination of M is based on a lookup table accessed based on the RI and NZWA.

16. The apparatus of claim 15, wherein the mapping table is configured by a base station.

17. The apparatus of claim 15, wherein the mapping table is associated with the configured or allocated resource for CSI reporting.

18. The apparatus of claim 15, wherein the mapping table is generated differently depending on what resource is allocated for CSI feedback.

19. The apparatus of claim 13, wherein the determination of M is performed to ensure the CSI feedback for the M subbands will fit based on a payload size of the second CSI feedback part.

20. The apparatus of claim 19, wherein M is selected based on a maximum supported value for the payload size.

21. The apparatus of claim 13, wherein:
    a first subband associated with a best CQI in a set of consecutive subbands is included in the M subbands; and
    a second subband associated with a worst CQI in the set of consecutive subbands is also included in the M subbands.

22. The apparatus of claim 13, wherein:
    the subbands to include in the M subbands is based on a decimation pattern.

23. The apparatus of claim 22, wherein:
    the subbands to include in the M subbands is also based on a CQI associated with the subbands.

24. The apparatus of claim 22, wherein:
    the decimation pattern results in the inclusion of every other subband of a set of subbands.

25. An apparatus for wireless communications, comprising:
- at least one processor configured to determine, in a two-part channel state information (CSI) reporting scheme, a first number M out of N subbands to use for feeding back CSI in a second CSI feedback part, wherein N represents a configured number of supported subbands for subband precoding matrix indicator (PMI) reporting and to decide, based on a rank indicator (RI) and a non-zero wideband amplitude (NZWA) per layer, which of the N subbands to omit from the M subbands; and
- a transmitter configured to transmit CSI feedback for the M subbands in the second CSI feedback part.

26. A non-transitory computer readable medium having instructions stored thereon for:
- determining, in a two-part channel state information (CSI) reporting scheme, a first number M out of N subbands to use for feeding back CSI in a second CSI feedback part, wherein N represents a configured number of supported subbands for subband precoding matrix indicator (PMI) reporting;
- deciding, based on a rank indicator (RI) and a non-zero wideband amplitude (NZWA) per layer, which of the N subbands to omit from the M subbands; and
- reporting CSI feedback for the M subbands in the second CSI feedback part.

\* \* \* \* \*